K. Agnew

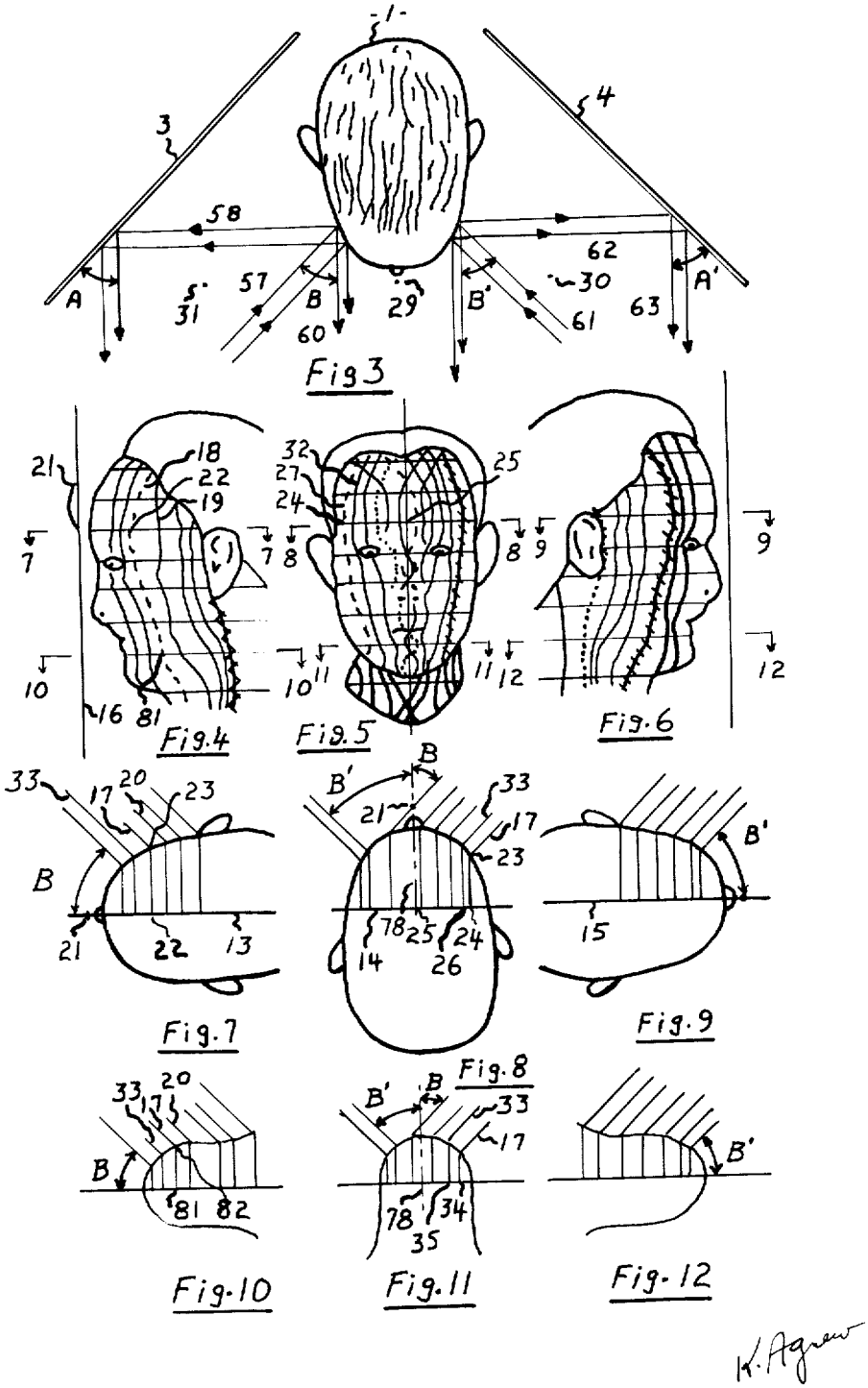
K. Agnew

K. Agnew

K. Agnew

United States Patent Office

Re. 25,930
Reissued Dec. 7, 1965

25,930

RECORDING AND REPRODUCING THE SHAPE OF THREE-DIMENSIONAL OBJECTS

Kenneth L. Agnew, Falconbridge, Ontario, Canada

Original No. 3,085,923, dated Apr. 16, 1963, Ser. No. 33,682, June 3, 1960. Application for reissue July 22, 1964, Ser. No. 395,975
4 Claims. (Cl. 156—58)

Matter enclosed in heavy brackets [ ] appears in the original patent but forms no part of this reissue specification; matter printed in italics indicates the additions made by reissue.

This invention relates to a method of recording and reproducing the shape of three-dimensional objects by means of contour lines produced by rays of light projected on the object, at an angle between the line connecting the object and its two-dimensional image, or images, and the plane, or planes, normal thereto, and to the subsequent reproduction in three dimensions of the object by following these contour lines with a stylus or other tracing device free to move normal to the resulting plane of the image or images, and attached to a cutting or forming tool which is fed at the same angle with reference to the material being shaped as the original rays of light were projected.

A usual method of indicating the topography of an object is by establishing a base in the plane of the sheet on which the plan is made, and joining all points having the same elevation above this basal plane. This produces the same effect that light rays projected in a plane normal to the line connecting the image and object would produce. However, where an abrupt increase in height appears, or where the object is undercut with reference to the observer, the contour lines would be very crowded or disappear.

In my method the contour lines are formed by light rays projected at the most advantageous angle to delineate the object, and are imaged in [two] *one* or more views, [so that] *and* if not clearly seen and separated due to the angle of observation in one view, they will show clearly in another view. Any or all of the views may be used in reproducing by orienting the material being shaped, and the cutting or forming tool, so that the tool is fed at the same relative angle to the material being shaped as the original light rays were to the shape to be reproduced, while the stylus is following the contour lines on the image. Obviously the image, and therefore the reproduction, may be increased or reduced in size as compared to the original object.

The present invention will be more fully understood from the following description, taken in connection with the attached drawings, in which:

FIG. 3 is an enlarged view of a portion of FIG. 1, indicating the path of light rays to and from the object whose shape is to be reproduced.

FIG. 4 is a representation of the image formed by the mirror at the left in FIG. 3.

FIG. 5 is a representation of the image formed directly by the object.

FIG. 6 is a representation of the image formed by the mirror at the right in FIG. 3.

FIG. 7 is a section of the image indicated by the line 7—7 of FIG. 4, showing points produced by light rays projected from the left, as indicated in FIG. 3, with the outline of the shape reproduced at this section.

FIG. 8 is a section of the image indicated by the line 8—8 on FIG. 5, after reversal, showing points produced by some of the light rays projected from the left and right, as indicated in FIG. 3, with the outline of the shape reproduced at this section.

FIG. 9 is a section of the image indicated by the line 9—9 on FIG. 6, showing points produced by light rays projected from the right, as indicated in FIG. 3, with the outline of the shape reproduced at this section.

FIG. 10 is a section of the image indicated by the line 10—10 on FIG. 4, showing points produced by light rays projected from the left, as indicated in FIG. 3, with the outline of the shape reproduced at this section.

FIG. 11 is a section of the image indicated by the line 11—11 on FIG. 5, showing points produced by some of the light rays projected from the left and right, with the outline of the shape reproduced at this section, after reversal.

FIG. 12 is a section of the image indicated by the line 12—12 on FIG. 6, showing points produced by light rays projected from the right, as indicated in FIG. 3, with the outline of the shape reproduced at this section.

Figure 1:
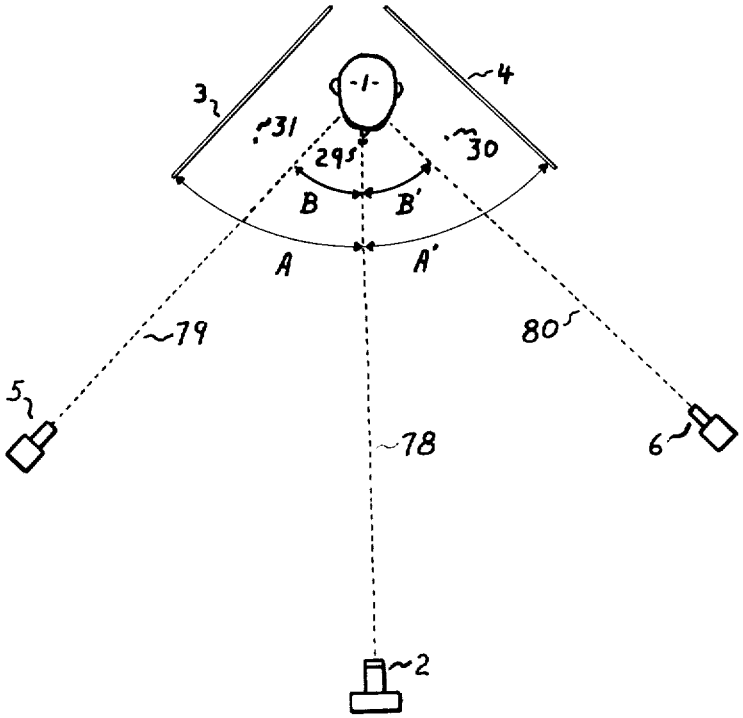
FIG. 1 is a diagrammatic plan of an arrangement used to obtain the contour lines.
Figure 2:
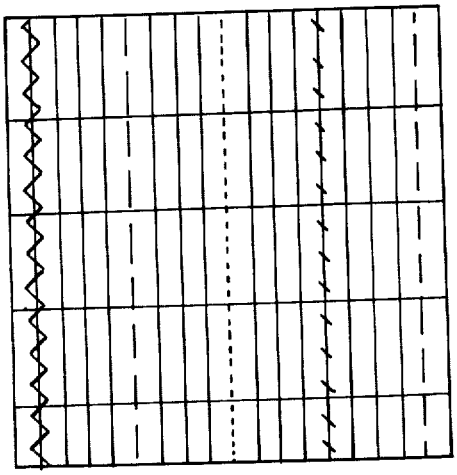
FIG. 2 is a view of a typical pattern projected to produce contour lines.

Referring first to FIG. 1, 1 indicates the object, the front portion of whose shape is to be reproduced. 2 is a camera by which a photograph of both the direct view of the object and the images reflected in mirrors 3 and 4 may be taken, normally in one exposure, although separate exposures of the two mirror images and the object may be made. 78 is a straight line joining the object and the direct image, and this directional line, and its extension, appears as a datum line throughout. 79 and 80 are straight lines joining the projectors 5 and 6 and the object. In this illustration, the angles A and A′ of the two mirrors to the line joining the object 1 to camera 2 are shown as substantially 45°. This mirror angle would produce, in a camera of infinite focal length, a view of the object in a plane parallel to the line joining object 1 and camera 2, but for a camera of finite focal length a somewhat smaller angle than 45° will be required to produce these mirror views. 5 and 6 are projectors, each of which throws a pattern, such as is shown in FIG. 2, to strike the object, the line joining object and projector being, in this illustration, at 45° to the line joining camera and object. The center line of the lenses of the camera and projectors are shown in the same horizontal plane, although this is not a necessary condition. 29, 30 and 31, FIG. 1 are vertical strings which may be used to determine the angular position of the side views with reference to the frontal view, by adjusting the mirrors so that two strings coincide, and may also act as index lines in the subsequent reproduction.

57, 38 and 59, FIGURE 3, indicate the path of two light rays from the projector 5, as reflected from the object and the mirror to the camera. 57 and 60 indicate the path of two light rays from the projector 5, as reflected from the object to the camera. 61, 62, 63 and 64 similarly indicate the path of two light rays from the projector 6.

With the arrangement described above, a photograph similar to FIGURES 4, 5 and 6 combined will be obtained. Unless a very long focus lens is used, FIGURES 4 and 6 will be outlined in the negative on a smaller scale than FIGURE 5, due to the longer path from the object, to mirror, to camera, than direct from object to camera, of the light rays. However, this disparity may readily be eliminated by enlarging, or reducing, the three portions of the negative separately, or three separate cameras could be used to obtain images to identical scales. Indeed, if space and cameras are available, the mirrors in this and subsequent illustrations may be replaced by cameras focused to record directly instead of the views reflected in the mirrors.

Also, due to the divergent rays normally projecting the pattern, and the convergent rays collected by the camera lens, there will be some distortion of the contour lines outlining the object due to its finite depth, which may be rendered negligible by use of long-focus (telescopic) lenses on the camera or cameras, and the projector or projectors.

Referring to FIGURE 7, 13 is a print made from the negative (negative and print may be used as interchangeable terms in this specification, but normally replaceable and variable-size prints would be used for convenience), FIGURE 4, and 22 is the point at which a projected vertical line striking the object was imaged at section 7—7, FIGURE 4. 21 is an abritarily selected point, which may be on the object, but in this case was the image of vertical strings 29, 30 and 31, FIGURE 1, in front of the object, producing line 16, used as an index line, which may be considered as a pivot around which the view shown in FIGURE 4 is rotated, and intersected by section 7—7, FIGURE 4.

Considering the print 13, FIGURE 7, as a reference plane, and the point 21 a reference point, the point 23, corresponding in three dimensions to point 22 on the two-dimensional print, may be obtained by advancing a pointer, in the plane of the paper, along a plane 17, which is normal to the plane of the paper, and is, in this illustration, at the same angle B to the print as the original projected ray was to the line joining camera and object, as this line lies in the plane of the print, until it is the distance 24 to 25, FIGURE 8, above the point 22 on print 13, FIGURE 7, 25 being the point at which the image 28 of the string 29 is intersected by section 8—8, FIGURE 5.

Using point 23 as the starting point and moving in plane 17 to maintain the pointer directly above the line 18 on which 22 is a point, it will be found that one outline of the shape of the original object has been traced. FIGURE 10 illustrates the situation when the pointer reaches the point of intersection with section 10—10, FIGURE 4, 81 representing the point of intersection on the print, and 82 the position of the pointer when it is above this point.

Referring now to FIGURE 2, the distance between the vertical lines projected bears a fixed ratio to the distance between the horizontal lines projected. Therefore, in this illustration, by measuring the distance between the projected horizontal lines as appearing in FIGURE 4, the distance between plane 17 in FIGURE 7, corresponding to one projected vertical line, and plane 20, corresponding to an adjacent projected vertical line, may be calculated. The pointer may then be moved from plane 17 to parallel plane 20, where by moving thhe pointer in plane 20 to maintain it vertically above the contour line 19, another outline of the shape of the original object may be traced. This process may be repeated until all the contour lines clearly distinguishable in this view are traced.

Referring to FIGURE 8, 14 is a section of a print made from the negative, FIGURE 5, after reversal of the negative. 28 is the recorded trace of string 29, FIGURE 1, and 25, FIGURE 8 is the point on the resulting print where the image of the string is intersected by section 8—8. 24 is a point on this print corresponding to the same point 23 on the shape being reproduced as the point 22 does on print 13, FIGURE 7. 17, FIGURE 8, is the same plane as appears in FIGURE 7, being normal to the plane of the paper and having the same angle B to the line joining object to camera, as was shown in FIGURE 7. Contour line 27, FIGURE 5, is a recording of the same projected ray of light as produced the contour line 18, FIGURE 4. The pointer is adjusted until it is directly above point 24 on print 14 and in the same position 23 with reference to the shape being reproduced as when outlining the previous portion of the shape, and by moving the pointer in plane 17 so that it is maintained directly above the contour line the same outline will be traced as was traced by following contour line 18, FIGURE 4.

Normally, the pointer, after being indexed, will be moved directly to plane 33, parallel to plane 17, as described above in connection with FIGURES 4, 7 and 10, and another outline traced above contour line 32, followed by successive similar operations until all distinct contour lines produced by light rays from projector 5, FIGURE 1, have been traced. Points 34 and 35, FIGURE 11, are points on contour lines 27 and 32, respectively, at section 11—11, FIGURE 5.

The contour lines from projector 6, FIGURE 1, outlining the right-hand side of the object shown in FIGURE 5, may now be used, in the same manner, to continue the three-dimensional outline, commencing at a known index point and advancing the pointer along planes normal to the plane of the paper and at angle B' to the line joining object and camera.

In a similar fashion to the above-described transfer of operations from the view illustrated by FIGURES 4, 7 and 10, to that illustrated by FIGURES 5, 8 and 11, the transfer to the right-hand view illustrated by FIGURES 6, 9 and 12, may now be made, starting from a known index point and advancing the pointer along planes normal to the plane of the paper and at angle B' to the line joining object and camera, which line, in this illustration, is in the plane of the print 15.

Figures 13, 14:
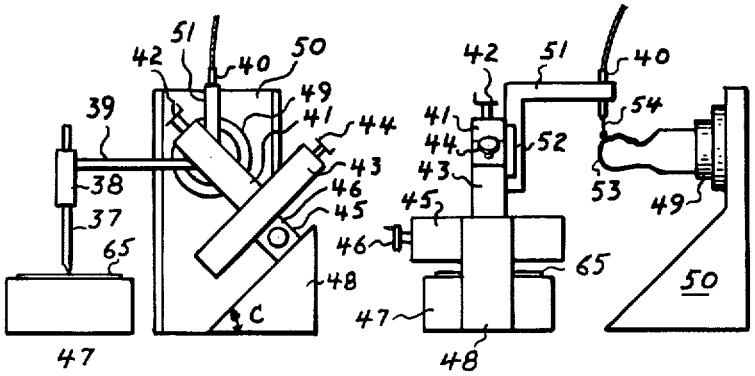
FIG. 13 is a front elevational view of the apparatus used to reproduce the three-dimensional shape by means of the contour lines.
FIG. 14 is a side view of the apparatus illustrated in FIG. 13.

Considering now an apparatus by means of which the contour lines on a two-dimensional image may be used to reproduce the original shape in the three dimensions, 65, FIGURES 13 and 14, is a photographic print or negative with contour lines as in FIGURES 5, 8 and 11, fastened to a support 47 and oriented as print 13, FIGURE 7; 14, FIGURE 8; or 15, FIGURE 9. 37 is a pointer or stylus sliding freely up and down in support 38. Support 38 is attached rigidly by means of a bracket 39 to the base of a vise 52. Vise 52, FIGURE 14, holds a bracket 51, which supports a cutting or forming tool 40, with bit 54. 41, 43 and 45 are three screw feeds, at right angles to each other in this illustration, carrying the vise or tool holder 52, and with graduated adjusting wheels 42, 44 and 46, fastened to base 48. This base has, or may be adjusted to, such an angle C with the base plane, that the tool clamped via vise 52 is fed by screw feeds 41 or 43, in conjunction with the horizontal screw feed 45, in a plane having the same angle with the image of the object in print 65, as the light ray originally producing the contour line being followed bore to the object. Alternatively, or additionally, the angle between screw feeds 41 and 43 may be adjustable, but this is not shown nor normally necessary.

In preliminary work, 43 and 45 were a compound tool rest from a lathe, supporting a milling attachment 41.

As indicated in FIGURE 13, screw feeds 41 and 43 are both adjustable in the plane of the paper, and screw feed 45 is adjustable normal thereto.

Vise 49 is rotatable about its base and holds the material being shaped 53. 50 is the support for this vise, and may include means for adjusting the vise vertically or horizontally, to facilitate positioning of the material 53 to an index point.

Correlating the right-hand side of FIGURE 8 with FIGURES 13 and 14, the bit 54 is adjusted to an index point on the material 53 and the pointer 37, or print 65, adjusted so that the pointer rests on the corresponding index point on the print, for instance, point 24, FIGURES 5 and 8. Screw feed 43, advancing and retracting in plane 17, in conjunction with screw feed 45 at right angles to it, may then be used to maintain the pointer on contour line 27 while the connected bit 54 is reproducing a corresponding outline in the material being worked 53. Screw feed 41 is then used to transfer bit 54 to plane 33, when contour line 42 may be followed by pointer 37. This operation may be repeated to retrace all the contour lines projected by projector 5, FIGURE 1.

When tracing the contour lines projected on the left-hand side of FIGURE 8, screw feed 41, in conjunction with screw feed 45, will be used to provide motion in planes normal to the paper and at the same angle B′ to the original line joining object and image as were the original projected light rays. Screw feed 43 will then merely adjust from plane to plane.

Figures 15, 16, 17:
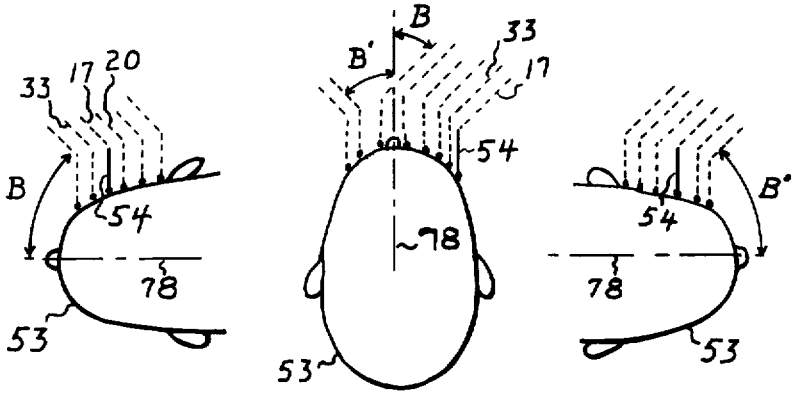
FIG. 15 is an enlarged view of the material being shaped, with the cutting tool shown in the various positions indicated by the contour lines in FIGS. 4 and 7.
FIG. 16 is an enlarged view of the material being shaped, with the cutting tool shown in the various positions indicated by the contour lines in FIGS. 5 and 8.
FIG. 17 is an enlarged view of the material being shaped, with the cutting tool shown in the various positions indicated by the contour lines in FIGS. 6 and 9.

When transferring from view to view, the material 53, FIGURE 14, will be rotated in vise 49 by an amount corresponding to the angle between the views. For instance, referring to the object 1, FIGURE 3, and to FIGURES 4, 7 and 10, indicating a corresponding record, the material 53, FIGURE 14, may be oriented in the vise 49 so that this portion may be shaped, by rotating the material 53 in the vise 49 in a counter-clockwise direction by the same amount as is represented by the angular difference in viewing between FIGURE 5 and FIGURE 4, in this case 90°, and the portion represented by FIGURES 4, 7 and 10 shaped. Alternatively, the cutting and feed mechanism may be revolved around the material. FIGURES 15, 16 and 17 show the material 53, after shaping, corresponding to the sections shown in FIGURES 7, 8 and 9, with the bit 54 shown in various positions corresponding to contour lines, and the angles of feed along parallel planes indicated.

By tracing all distinguishable lines, a three-dimensional reproduction of the original shape is thus formed in material 53, the precision of which will depend largely on the number of contour lines per unit area.

It is obvious that if projectors 5 and 6, FIGURE 1, are not in the same place as the object 1 and camera 2, the horizontal projected lines will also be contour lines, which may be traced, this being a procedure which might be desirable in some cases. It is also obvious that the horizontal lines are convenient, but not strictly necessary, and that instead of vertical lines, diagonals might be projected, with a corresponding adjustment in the angle of screw feed 45 in relation with the other two screw feeds.

Figure 18:
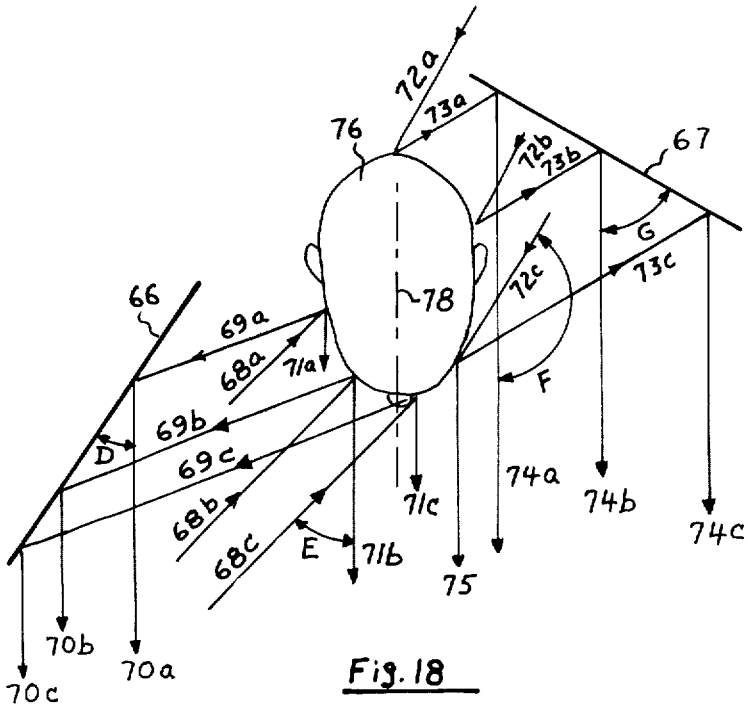
FIG. 18 is a plan of the object, showing incident and reflected rays, and imaging mirrors, at two different angles.

In the above description, for the sake of clarity, three views at 90° intervals are indicated, but the process is not so limited. For instance, FIGURE 18 shows the situation where the angle D of one mirror to the lines joining object and mirror to the camera is 35°, and the angle G of the other mirror to the same lines is 60°. As indicated above, light rays producing images may be considered parallel when a telephoto camera lens is used, and so 70a, 70b, 70c, 71a, 71b, 71c, 74a, 74b, 74c, 75 and 78 are shown as parallel lines joining the combined views of object and mirror images to the camera.

In FIGURE 18, 68a, b and c are projected rays of light at angle E, in this case E equalling 45°, to the lines joining object and camera, reflected by the object 76 direct to the camera as rays 71a, b and c and also, via the left-hand mirror, having an angle D to the lines joining object and image, by the path shown as 69a, b and c, and 70a, b and c.

Similarly, 72a, b and c are incident rays of light at angle F, in this case 150°, to the lines joining object and camera, and 75 is a ray direct from object to camera, whereas other rays are reflected by mirror 67 as 73a, 73b, 73c, 74a, 74b and 74c to the camera.

Figure 19:
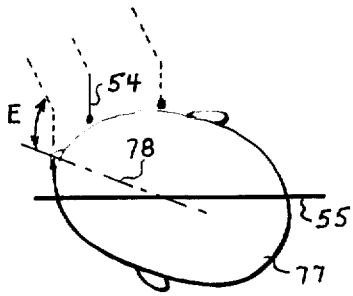
FIG. 19 is a view of the material being shaped, as imaged on the left side of FIG. 18, with the cutting tool shown in the various positions indicated by contour lines, and the material oriented for this view, with the plane of the image superimposed.

55, FIGURE 19, is the plane of the print or negative produced by the section of the image appearing in mirror 66. Theoretically, with lenses of infinite focal length, the plane of a print produced by a mirror at an angle of 45° to the lines joining object and camera would be in the same plane as these lines. Therefore, the plane of the print taken by means of a mirror with a smaller angle would be 2(45°—D°) to the lines joining object and camera.

Figure 20:
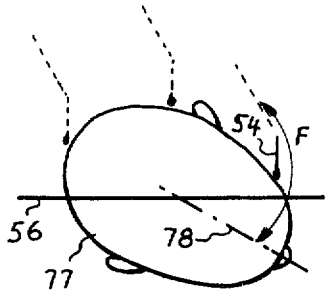
FIG. 20 is a view of the material being shaped, as imaged on the right side of FIG. 18, with the cutting tool shown in the various positions indicated by contour lines, and the material oriented for this view, with the plane of the image superimposed.

Similarly, 56, FIGURE 20, is the plane of the print or negative produced by the section of the image appearing in mirror 67. In this case, theoretically, the plane of the print taken by means of a mirror with a greater angle would be 2(G°—45°) to the lines joining object and camera.

Superimposed on print 55, FIGURE 19, and 56, FIGURE 20, are outlines of the reproduced shape, with the bit 54 shown in various positions corresponding to contour lines, and the angles of feed along parallel planes indicated.

The plane in which the forming tool moves while the pointer is following a contour line, must, of course, be at the same angle to the material being shaped as was the original projected ray of light to the object being viewed, that is, in this illustration, at 65° to the plane of the print 55 in FIGURE 20, assuming a lens of infinite focal length, with a 190° clockwise rotation, or 170° counterclockwise rotation, of the material 77 when transferring from the view indicated by FIGURE 19 to that indicated by FIGURE 20. The direct view is not shown.

In obtaining the view shown as print 56, FIGURE 20, indicated with superimposed outline 77, it would be more convenient to use a second camera in place of the mirror. However, rays 72 could be reflected from the mirror on to the object. They could also be projected over or under the mirror, but in this case a horizontal line would also be a contour line. Projection through a one-way mirror is also possible.

Many additional variations and combinations based on the primary apparatus, such as use of varied colored or shaded lines or bands, pantographic apparatus between image and model, automatic operation with electromagnetic or photoelectric tracing of contour lines, production of an image rather than a photographic film or print, projection and recording of one or a few of the lines at a time, will be obvious to persons skilled in the art.

It is also possible to interchange the positions of the material being shaped and the forming or shaping tool, so that the material is moved in the plane of the projected light rays rather than the forming tool.

Projected straight lines are specified above, but this does not preclude the use of zig-zag lines or curves, which may obviously be used, but would introduce the complications of coordinating feed 45 with print 65 and material 53, as would the use of diagonal straight lines crossing at an acute angle. Lines may, of course, be projected individually rather than as a group.

Having described the invention, what is claimed as new is:

1. A method for reproducing the shape of three-dimensional objects, comprising the steps of registering images of the object, projecting the images of multiple lines [simultaneously] on to the object by light rays whose planes of passage are at a substantial angle to both the lines joining object and images and to the planes to which the lines joining object and images are perpendicular, said lines being projected as groups along parallel rays, and thus form contour lines superimposed on the images of the obejct; followed by the steps of guiding a tracing device, said tracing device being inserted in a holding device in such a way that it is free to move only in a direction with respect to the holding device that is normal to the plane of the image, and said holding device being connected to a cutting tool moving in a plane having the same angle to the image as the plane of passage of the light ray was to the object *as it was viewed in two dimensions,* and in such a way that both holding device and cutting tool simultaneously share the same motions in said plane of passage of the light ray, and also in a plane parallel to said plane, while a contour line is being traced, and thus reproducing an outline, then moving the cutting tool to a parallel plane, and the tracing device to the corresponding contour line; adjusting the feed mechanism of the cutting tool to feed in planes corresponding to different angular projections of light rays on the object *as it was viewed in two dimensions,* and rotating the material being shaped to correspond with images showing different views of the object so that corresponding outlines may be formed, the sum of the outlines producing the reproduction of the shape in three dimensions.

2. A method for reproducing the shape of three-dimensional objects, comprising the steps of registering images of the object, projecting the images of multiple lines [simultaneously] on to the object by light rays whose planes of passage are at a substantial angle to both the lines joining object and images and to the planes to which the line joining object and images are perpendicular, said lines being projected as groups along parallel rays, and thus form contour lines superimposed on the images of the object; followed by the steps of guiding a tracing device, said tracing device being inserted in a holding device in such a way that it is free to move only in a direction with respect to the holding device that is normal to the plane of the image, and said holding device being connected to a cutting tool moving in a plane having the same angle to the image as the plane of passage of the light ray was to the object *as it was viewed in two dimensions,* and in such a way that both holding device and cutting tool simultaneously share the same motions in said plane of passage of the light ray, and also in a plane parallel to said plane, while a contour line is being traced, and thus reproducing an outline, then moving the cutting tool to a parallel plane and the tracing device to the corresponding contour line; adjusting the feed mechanism of the cutting tool to feed in planes corresponding to different angular projections of light rays on the object *as it was viewed in two dimensions,* and revolving the cutting tool with its associated feed mechanism to correspond with images showing different views of the object so that corresponding outlines may be formed, the sum of the outlines producing the reproduction of the shape in three dimensions.

3. A method for reproducing the shape of three-dimensional objects, comprising the steps of registering images of the object, projecting the images of multiple lines [simultaneously] on to the object by light rays whose planes of passage are at a substantial angle to both the lines joining object and images and to the planes to which the line joining object and images are perpendicular, said lines being projected as groups of parallel rays, and thus form contour lines superimposed on the images of the object; followed by the steps of guiding a tracing device, said tracing device being inserted in a holding device in such a way that it is free to move only in a direction with respect to the holding device that is normal to the plane of the image, and said holding device being connected to the material being shaped moving in a plane having the same angle to the image as the plane of passage of the light ray was to the object *as it was viewed in two dimensions,* and in such a way that both holding device and the material being shaped simultaneously share the same motions in said plane of passage of the light ray, and also in a plane parallel to said plane, while a contour line is being traced, and thus reproducing an outline, then moving the material being shaped to a parallel plane, and the tracing device to the corresponding contour line; adjusting the feed mechanism carrying the material being shaped to feed in planes corresponding to different angular projections of light rays on the object *as it was viewed in two dimensions,* and rotating the material being shaped to correspond with images showing different views of the object so that corresponding outlines may be formed, the sum of the outlines reproducing the shape in three dimensions.

4. A method for reproducing the shape of three-dimensional objects, comprising the steps of registering images of the object, projecting the images of multiple lines [simultaneously] on to the object by light rays whose planes of passage are at a substantial angle to both the lines joining object and images and to the planes to which the lines joining object and images are perpendicular, said lines being projected as groups of parallel rays, and thus form contour lines superimposed on the images of the object; followed by the steps of guiding a tracing device, said tracing device being inserted in a holding device in such a way that it is free to move only in a direction with respect to the holding device that is normal to the plane of the image, and said holding device being connected to the material being shaped moving in a plane having the same angle to the image as the plane of passage of the light ray was to the object *as it was viewed in two dimensions,* and in such a way that both holding device and the material being shaped simultaneously share the same motions in said plane of passage of the light ray, and also in a plane parallel to said plane, while a contour line is being traced, and thus reproducing an outline, then moving the material being shaped to a parallel plane and the tracing device to the corresponding contour line; adjusting the feed mechanism carrying the material being shaped to feed in planes corresponding to different angular projections of light rays on the object *as it was viewed in two dimensions,* and revolving the cutting tool to correspond with images showing different views of the object so that corresponding outlines may be formed, the sum of the outlines reproducing the shape in three dimensions.

References Cited by the Examiner

The following references, cited by the Examiner, are of record in the patented file of this patent or the original patent.

UNITED STATES PATENTS

| | | | |
|---|---|---|---|
| 1,382,978 | 6/1921 | Hopkins | 156—58 |
| 1,546,636 | 7/1925 | Engelmann | 156—58 |
| 2,006,774 | 7/1935 | Ohlsson. | |
| 2,015,457 | 9/1935 | Morioka. | |
| 2,085,400 | 6/1937 | Tomozawa | 156—58 |
| 2,335,127 | 11/1943 | Ling | 156—58 |
| 2,502,697 | 4/1950 | Blain. | |
| 2,702,496 | 2/1955 | Davis et al. | |
| 2,891,339 | 6/1959 | Kao. | |
| 2,981,147 | 4/1961 | Carter et al. | 156—58 XR |

EARL M. BERGERT, *Primary Examiner.*

ALEXANDER WYMAN, JACOB STEINBERG, *Examiners.*

H. ANSHER, *Assistant Examiner.*